(12) United States Patent
Case et al.

(10) Patent No.: US 6,305,672 B1
(45) Date of Patent: Oct. 23, 2001

(54) FENCE PROTECTOR APPARATUS

(76) Inventors: Richard E. Case; Judith Ann Case, both of 15210 NE. 192nd St., Holt, MO (US) 64048

( * ) Notice: Subject to any disclaimer, the term of this patent is extended or adjusted under 35 U.S.C. 154(b) by 0 days.

(21) Appl. No.: 09/383,333

(22) Filed: Aug. 26, 1999

(51) Int. Cl.$^7$ ................................................. E04H 17/14
(52) U.S. Cl. ............................................. 256/65; 256/68
(58) Field of Search .................................. 256/65, 68, 66, 256/70; 403/286, 169, 172; 52/716.8, 459, 465; 24/339

(56) References Cited

U.S. PATENT DOCUMENTS

| | | | |
|---|---|---|---|
| 2,118,467 | * 5/1938 | Jones | 256/65 X |
| 2,879,087 | * 3/1959 | Haglund | 403/169 X |
| 3,221,439 | * 12/1965 | Schaper | 403/169 X |
| 3,907,239 | * 9/1975 | Ehrlich | 24/339 X |
| 4,208,037 | 6/1980 | Le Gal . | |
| 4,523,745 | 6/1985 | Killman et al. . | |
| 4,710,049 | 12/1987 | Chang . | |
| 5,076,545 | 12/1991 | Bodzin . | |
| 5,481,772 | 1/1996 | Glynn et al. . | |
| 5,642,545 | 7/1997 | Howard . | |

* cited by examiner

Primary Examiner—Lynne H. Browne
Assistant Examiner—John R. Cottingham
(74) Attorney, Agent, or Firm—John C. McMahon

(57) ABSTRACT

A protective apparatus to reduce the likelihood that livestock, especially a horse or a cow, will have a limb trapped in the opening between two adjacent fence panels having upper horizontal elements and closely-spaced vertical riser elements. The apparatus includes a U-shaped spanning member that is received over and extends between the upper elements of adjacent fence panels. The apparatus also includes a tail depending from the spanning member and a pair of riser engaging members that extend outwardly on opposite sides of the tail member and in vertical spaced relation to the spanning member. The riser engaging members are sized and shaped to receive respective riser elements of adjacent fence panels.

9 Claims, 1 Drawing Sheet

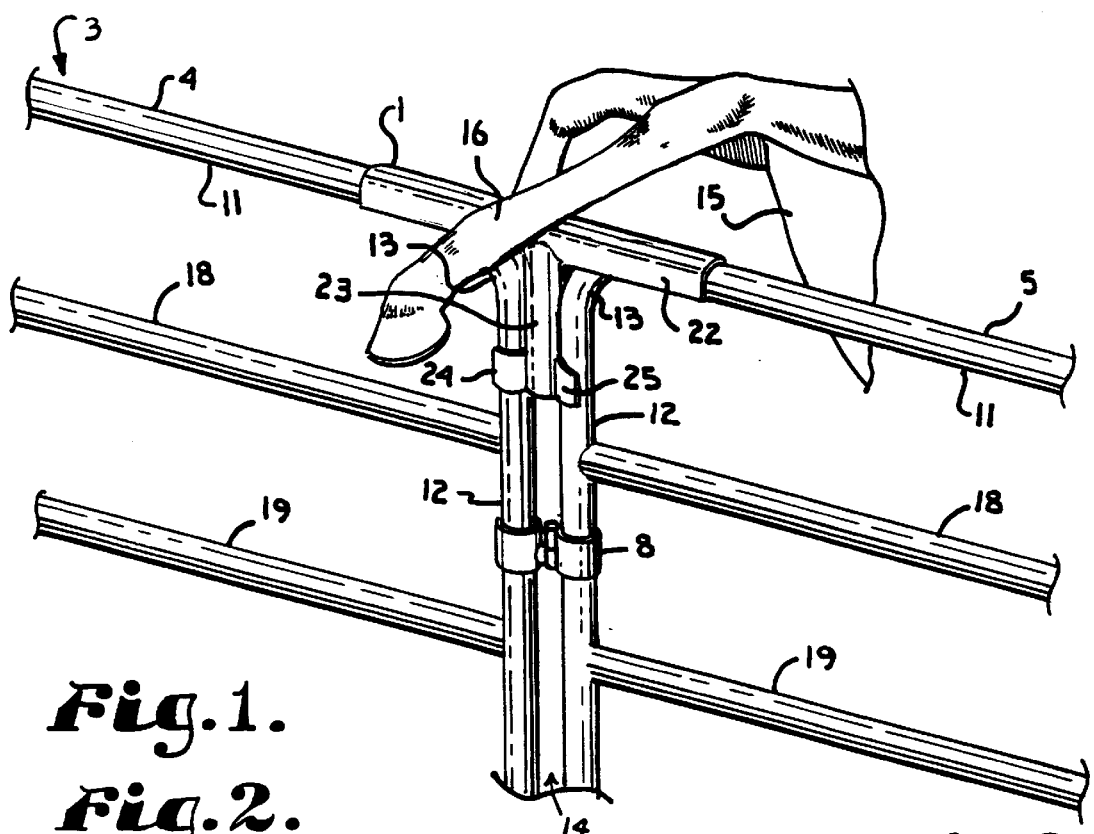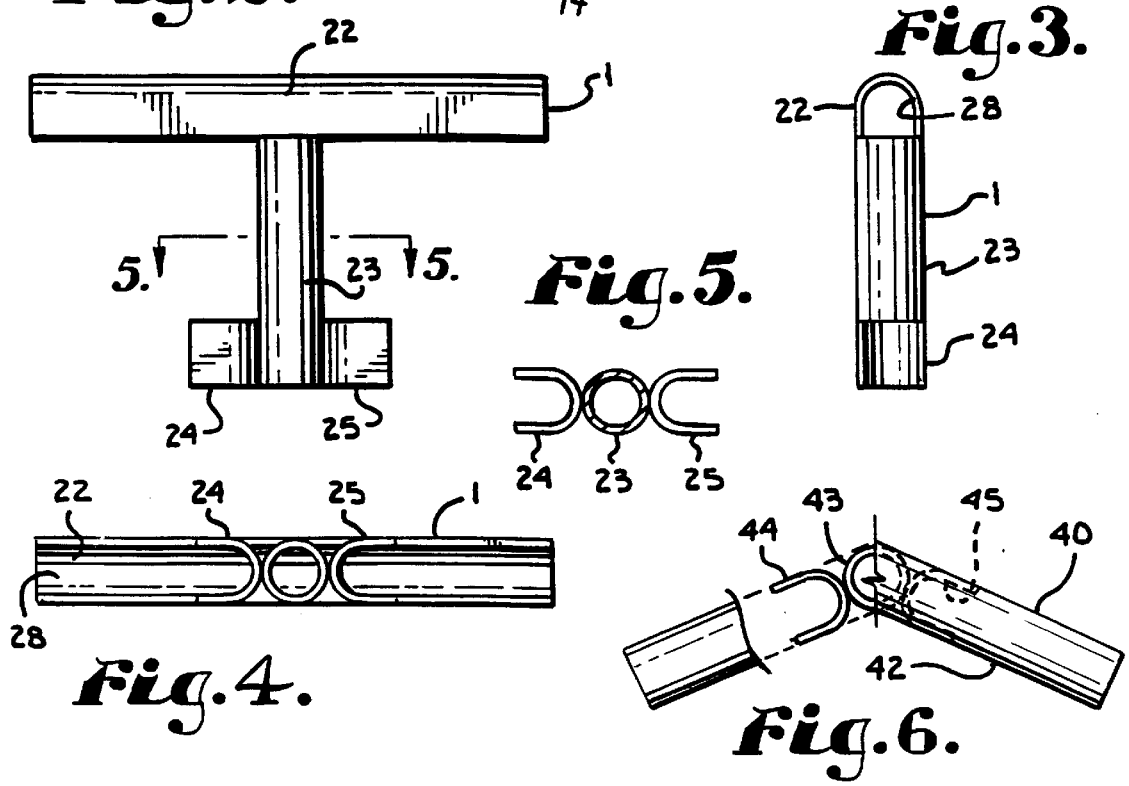

FENCE PROTECTOR APPARATUS

BACKGROUND OF THE INVENTION

The present invention is directed to an apparatus for mounting between adjacent fence panels, between a gate and a fence panel, or the like in order to protect livestock, such as horses and cows, from inadvertently injuring themselves by catching a leg between two adjacent panels of a fence or corral.

Corrals, enclosed barnyards and fences in general often pose a hazard to horses, cattle and other livestock. One of the particular hazards that such animals incur is that corrals, fences and similar enclosures are often constructed of panels which are normally joined together at opposite ends and which have spacing therebetween. This is especially true at the top of the panels where the panels are often curved to reduce sharp edges, making the spacing there greater and forming a Y-shaped opening. Furthermore, gates and similar structures have spacing between such structures and adjoining fencing or the like.

Although the horses, cattle and other livestock that are enclosed by fencing do not always rear up on their hind legs or otherwise raise their front legs, they do so with some degree of regularity. Some animals are much more prone to this behavior than others. When an animal does this, the front legs sometimes flail against the top of a fence. In some instances the animal may be trying to go over a fence. If the leg strikes the fence or enclosure at the junction of two adjacent panels or where a gate joins with other fencing, the animal may have its leg fall between the adjacent structures and be pinned there. The animal then tries to pull its leg from its entrapment. This causes damage to the leg which, at best, is usually ripped and torn flesh. However, it is quite frequent that a horse or other animal may break its leg which seriously endangers the life of the animal.

Consequently, it is desirable to be able to protect the juncture of two fencing panels or other structure so as to prevent animals from getting their legs entrapped between the structures.

SUMMARY OF THE INVENTION

The present invention provides an apparatus that extends between adjacent fence panels or other types of fencing units that have at least some spacing therebetween which extends at least part of the vertical length thereof, especially from the top. The apparatus includes an upper spanning member that is sufficiently long to extend between upper elements of the adjacent panels and a downwardly extending tail. The spanning member is cupped or V-shaped so as to have a downwardly facing mouth that is sized and shaped to snugly fit over the top elements of adjacent fence units.

The tail extends downwardly generally from the center of the spanning member. The tail includes a center element and a pair of half sleeves. The half sleeves are spaced by the center element from the spanning member and are positioned to face in opposite or at least partially opposed directions from each other. The half sleeves are sized and shaped to receive riser elements of respective fence units.

The entire apparatus is relatively rigid in construction and typically formed from metal or rigid plastic material. The mouth of the spanning member will often extend in opposite directions on either side of the tail. Likewise the half sleeves will typically be aligned to extend outwardly from opposite sides of the center element. However, where a corral or other structure is made of fencing panels that are joined at less than 180 degrees, the apparatus may be constructed so as to have the mouth and half sleeves configured at angles that allow mating juncture with such panels.

In use, the apparatus is placed over the opening between two fencing units and urged downwardly by the installer. For use with gates, the apparatus is removed when the gate is opened. The half sleeves are designed to engage and snugly receive upright portions of the fence :0 panels and the mouth of the spanning member is likewise designed and shaped to receive the upper end of a pair of adjacent panels. In this manner the spanning member protects the space between the fence units to prevent an animal from raising its leg above the fence units and then dropping the leg into such a space, while the half sleeves secure and stabilize the apparatus against the forces of an animal striking it.

OBJECTS AND ADVANTAGES OF THE INVENTION

Therefore, the objects of the present invention are to: provide an apparatus for preventing injuries to horses, cattle and livestock by reducing the likelihood that such animals will get their legs caught between adjacent fence panels or units; to provide such an apparatus that spans across the tops of adjacent panels and blocks an animal's leg from passing therebetween; to provide such an apparatus including a spanning member that extends between the top portion of both of two adjacent panels and a tail element that extends downwardly from the spanning member and joins with riser portions of the panel to stabilize the apparatus during use; to provide such an apparatus wherein the spanning member includes a mouth that extends on each side of the tail member that is adapted to be slidingly received on the upper portion of adjacent fence panels; to provide such an apparatus including lower half cylinders or semi-sleeves that extend around and receive the riser elements of the adjacent panels; to provide such an apparatus that is relatively rigid so as to deflect an animal's leg rather than give with the leg and allow an animal's leg to slip between the adjacent panels; to provide such an apparatus which can be manufactured in various configurations to allow for use wherein adjacent panels are coplanarly aligned or, alternatively, where the panels are aligned at angles less than 180 degrees relative to one another; to provide such an apparatus which is relatively easy to manufacture, simple to use and especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective and fragmentary view of a fence having two adjacent panels with spacing therebetween; shown in conjunction with the fence protective apparatus in accordance with the invention and illustrating a horse's leg striking the protective apparatus.

FIG. 2 is an enlarged front elevational view of the fence protective apparatus.

FIG. 3 is an enlarged side elevational view of the fence protective apparatus.

FIG. 4 is an enlarged bottom plan view of the fence protective apparatus.

FIG. 5 is an enlarged and cross sectional view of the fence protective apparatus, taken along line 5—5 of FIG. 2.

FIG. 6 is a top plan view of a modified fence protective apparatus with portions broken away to show detail thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a fence protective apparatus in accordance with the present invention. The apparatus 1 is illustrated in FIG. 1 in conjunction with a fence 3 having a pair of fence panels 4 and 5 that are secured together in slightly spaced relationship relative to one another by clamps or connectors such as illustrated clamp 8. Each of the fence panels 4 and 5 includes a top element or rail 11 that is generally horizontal in nature and an end element or riser 12 that is generally vertical in nature. The top rails 11 and risers 12 on each panel 4 and 5 are respectively joined together by a curved section 13 so as to be continuous. As is shown in FIG. 1, there is a spacing, identified by the reference arrow 14, between adjacent end members 12 that becomes greater between the curved sections 13. The spacing is sufficient for an animal, such as the partially illustrated horse 15, to have its leg 16 entrapped or caught in the space between the end members 12 and above the top clamp 8 in the absence of the apparatus 1. Each of the fence panels 4 and 5 include intermediate rails 18 and 19 also.

The fence protective apparatus 1 includes a spanning member 22, a tail 23 and a pair of half sleeves 24 and 25.

The spanning member 22 in the embodiment shown in FIGS. 1 through 4, is an elongate structure having a generally linear axis and being substantially U-shaped in cross section perpendicular to the axis thereof. The spanning member 22 effectively forms a mouth 28 that has portions on opposite sides thereof that are sized and shaped to slidably but snugly fit over respective fence panel top rails 11. That is, the mouth 28 is designed to face downwardly in operation and the apparatus 1 in general utilizes gravity to hold the apparatus 1 in place relative to the fence panels 4 and 5 by the positioning of the mouth 28 on the top rails 11. In the illustrated embodiment of FIGS. 1 through 5, the shape of the mouth 28 is generally U-shaped in nature. However, it is foreseen that this shape will be varied depending upon the thickness and the shape of the fence panels with which the apparatus 1 is to be utilized. That is, the shape could be rectangular in nature or some other configuration that would closely conform to the shape of the top of the fence panels and it is intended that the term U-shaped encompass similar shapes for this purpose. Opposite sides of the spanning member 22 may even be different in certain situations such as where a fence unit of one type is on one side of the apparatus 1 and a different type of unit or panel, such as a gate is utilized on the other side.

The tail member 23 depends from the center of the spanning member 22 and is affixed thereto. The tail member 23 is sized and shaped to fit in the spacing 14 between the fence panel end members 12. The illustrated tail member 23 is tubular and has an elongate central axis that is perpendicular to the spanning member axis.

The half sleeves 24 and 25 are secured to the lower end of the tail member 23. The half sleeves 24 and 25 function as riser element engaging members. In the embodiment shown in FIGS. 1 through 5, the half sleeves 24 and 25 extend outwardly from the tail 23 on opposite sides thereof. The half sleeves 24 and 25 are sized and shaped to be relatively snugly received about respective panel end riser elements 12 so as to stabilize the apparatus 1 during use and help hold the apparatus 1 in place should an animal, such as the horse 15, rear up and strike the apparatus 1.

The half sleeves 24 and 25 of the present embodiment are also somewhat U-shaped in nature and are preferably sized and shaped to snugly fit the particular end members or simply the end of the fence panels 4 and 5 with which the apparatus 1 is utilized. It is foreseen that the shape of the half sleeves 24 and 25 could be varied substantially to better fit particular structures that are rectangular or some other configuration and such shapes are intended to be encompassed in the term U-shaped as used herein.

The entire apparatus 1 is generally rigid in construction with the spanning member 22 being sufficiently rigid to resist being struck by the leg of a horse or other animal.

Illustrated in FIG. 6 is a second embodiment of the apparatus according to the present invention that is generally represented by the reference numeral 40. The apparatus 40 is quite similar to apparatus 1 except that it is sized, shaped and constructed to be utilized in conjunction with fence panels or units that are not coplanarly aligned. That is, wherein the top elements of such units are not linear.

The apparatus 40 includes a spanning member 42 that is bent at the middle thereof so as to conform with the alignment of the particular fence panels to be utilized. This bending may be at any angle associated with fence panels, but especially is typically fixed at angles associated with corrals where a set number of panels may be joined together to form a corral for a horse or the like. In this manner, only a certain number of different sizes and shapes of the apparatus must be constructed.

The apparatus 40 also includes a tail member 43 and a pair of half sleeves 44 and 45. The tail member 43 is essentially identical to the tail member 23 in the previous embodiment and the half sleeves 44 and 45 are similar in their placement to the half sleeves 24 and 25 of the previous embodiment except that they are not exactly located on opposite sides of the tail member 43, but rather are aligned to be positioned underneath and parallel with the opposite sides of the spanning member 42.

The apparatus 1 and the apparatus 40 are generally constructed from a relatively rigid material such as steel 1o or another metal of fairly strong strength to withstand exposure to the elements and which can withstand striking by an animal that has raised up above it and comes down upon it with its leg or the like. It is foreseen that the device can be manufactured of other types of rigid material such as a relatively strong, rigid plastic or the like.

In use the apparatus 1 and the apparatus 40 are placed in operation by an installer by raising the apparatus 1 or 40, as appropriate, above the juncture of adjacent fence panels, such as the illustrated panels 4 and 5, and then lowering the apparatus 1 or 40 such that the half sleeves associated therewith (24 and 25 in the first embodiment) engage and partially encircle the riser elements 12 of adjacent fence panels, such as 4 and 5. The apparati 1 or 40 is thereafter further lowered until the mouth of the spanning member, such as the mouth 28, engages and partially encircles the fence panel top elements 11. Thereafter, the spanning member provides an even and continuous extension between the two adjacent top elements or rails 11 so as to resist placement by an animal, such as the horse 15, of its leg in the space 14 between the fence panels 4 and 5.

It is to be understood that while certain forms of the present invention have been illustrated and described herein, it is not to be limited to the specific forms or arrangement of parts described and shown.

What is claimed and desired to be secured by Letters Patent is as follows:

1. A fence protective apparatus for protecting openings between fence panels; said apparatus comprising:

a) a rigid U-shaped spanning member having opposite sides that are sized and shaped to snugly fit over the top of respective fence panels and positioned to face downwardly during use;

b) a rigid tail member depending medially from said spanning member;

c) first and second rigid U-shaped riser engaging members aligned to have a vertical axis and to face generally in opposite directions from each other; each of said first and second riser engaging members being rigidly secured to said tail member in vertically spaced relation to said spanning member and being sized and shaped to be adapted to snugly receive a fence panel riser element; each of said riser engaging members extending from said tail member in the same direction as respective opposite sides of said spanning member.

2. The protective apparatus according to claim 1 wherein:

a) said spanning member has a central axis and portions of said spanning member on opposite sides of said tail member are aligned along said axis at 180 degrees from each other.

3. The apparatus according to claim 2 wherein:

a) said riser engaging member extend outwardly in opposite directions from opposed sides of said tail member.

4. The protective apparatus according to claim 1 wherein:

a) said spanning member has portions thereof positioned on opposite sides of said tail member; and b) said spanning member portions are non coaxially aligned with each other.

5. The protective apparatus according to claim 2, wherein:

a) said tail member is tubular; and b) said riser engaging members are each half sleeves.

6. A fence protective apparatus for reducing the likelihood of an animal of getting a leg of the animal caught between two adjacent units of the fence wherein the fence units each have respective top elements and closely spaced riser elements; said apparatus comprising:

a) a spanning member sized and shaped to be received over top elements of respective adjacent fence units;

b) a tail member extending downwardly from said spanning member and being sized and shaped to be positioned between two adjacent fence units;

c) a pair of riser engaging members mounted on and extending outwardly from said tail member; each of said riser engaging members being sized and shaped to receive a respective fence unit riser element during use, so as to stabilize said apparatus relative to the fence units; and d) said apparatus being sized and shaped for use with fence units that are not coplanar; said spanning member being non linear but having portions thereof on opposite sides of said tail member that are angled at less than 180° relative to each other.

7. A fence protective apparatus for reducing the likelihood of an animal of getting a leg of the animal caught between two adjacent units of the fence wherein the fence units each have respective top elements and riser elements closely spaced between adjacent units during usage; said apparatus comprising:

a) a spanning member having a pair of sides sized and shaped to be slidingly received respectively over a pair of closely spaced top elements that are discontinuous therebetween of respective adjacent fence units; said sides each being placed in use to run parallel to respective top elements;

b) a tail member extending downwardly from said spanning member and being sized and shaped to be positioned between two adjacent fence units;

c) a pair of riser engaging members mounted on and extending outwardly from said tail member and each being positioned to extend outwardly from said tail member in the same direction as respective spanning member sides; each of said riser engaging members being sized and shaped to receive a respective fence unit riser element during use, so as to stabilize said apparatus relative to the fence units; and wherein:

d) said spanning member and each of said riser engaging members is U-shaped to mate with respective fencing elements.

8. A fence protective apparatus for reducing the likelihood of an animal of getting a leg of the animal caught between two adjacent units of the fence wherein the fence units each have respective top elements and riser elements closely spaced between adjacent units during usage; said apparatus comprising:

a) a spanning member having a pair of sides sized and shaped to be slidingly received respectively over a pair of closely spaced top elements that are discontinuous therebetween of respective adjacent fence units; said sides each being placed in use to run parallel to respective top elements;

b) a tail member extending downwardly from said spanning member and being sized and shaped to be positioned between two adjacent fence units;

c) a pair of riser engaging members mounted on and extending outwardly from said tail member and each being positioned to extend outwardly from said tail member in the same direction as respective spanning member sides; each of said riser engaging members being sized and shaped to receive a respective fence unit riser element during use, so as to stabilize said apparatus relative to the fence units; and wherein:

d) each of said riser engaging members are U-shaped and face outwardly in opposite directions on opposite sides of said tail member.

9. An apparatus for protecting animals from having a limb of the animal trapped in an opening between two adjacent fence panels; said apparatus comprising:

a) a spanning member sized and shaped to be adapted to be placed over and span between upper elements of the two adjacent fence panels and having opposite sides extending outward sideways from near the center of said spanning member;

b) a fence panel riser element engaging member rigidly secured to but spaced vertically beneath said spanning member during use; said riser element engaging member being sized and shaped to be adapted to engage a riser element of at least one of the fence panels so as to stabilize said apparatus during use; said element engaging member extending outward sideways in the same direction as a first of said spanning member sides; and wherein:

c) said spanning member and said riser element engaging member are both U-shaped with said spanning member facing downward and said riser element engaging member facing outward during use.

* * * * *